United States Patent
Miyajima

(10) Patent No.: US 9,208,761 B2
(45) Date of Patent: Dec. 8, 2015

(54) MUSICAL INSTRUMENT TILTER AND CYMBAL STAND

(71) Applicant: HOSHINO GAKKI CO., LTD., Nagoya, Aichi (JP)

(72) Inventor: Hideyuki Miyajima, Nagoya (JP)

(73) Assignee: HOSINO GAKKI CO., LTD, Aichi (JP)

( * ) Notice: Subject to any disclaimer, the term of this patent is extended or adjusted under 35 U.S.C. 154(b) by 0 days.

(21) Appl. No.: 14/288,388

(22) Filed: May 28, 2014

(65) Prior Publication Data
US 2015/0243267 A1 Aug. 27, 2015

(30) Foreign Application Priority Data
Feb. 27, 2014 (JP) ................. 2014-037271

(51) Int. Cl.
G10D 13/02 (2006.01)
F16M 11/04 (2006.01)
F16M 11/12 (2006.01)

(52) U.S. Cl.
CPC ........... *G10D 13/026* (2013.01); *F16M 11/046* (2013.01); *F16M 11/12* (2013.01)

(58) Field of Classification Search
CPC ................................... G10D 13/026
See application file for complete search history.

(56) References Cited

U.S. PATENT DOCUMENTS

| | | | | |
|---|---|---|---|---|
| 2,971,738 A * | 2/1961 | Way | ........................ | 248/226.11 |
| 4,047,684 A * | 9/1977 | Kobayashi | ................. | 248/122.1 |
| 4,671,478 A * | 6/1987 | Schoenig et al. | .......... | 248/124.1 |
| 4,747,569 A * | 5/1988 | Hoshino | .................... | 248/291.1 |
| 5,154,382 A * | 10/1992 | Hoshino | .................... | 248/185.1 |
| 6,093,878 A * | 7/2000 | Hoshino | ........................ | 84/421 |
| 6,268,556 B1 * | 7/2001 | Liao | ................ | 84/421 |
| 6,814,332 B2 * | 11/2004 | Eason | ........................ | 248/122.1 |
| 6,838,602 B2 * | 1/2005 | Chang | ............................. | 84/327 |
| 7,256,338 B2 * | 8/2007 | Hsieh | ............................. | 84/421 |
| 7,320,449 B2 * | 1/2008 | Hsieh | ........................ | 248/122.1 |
| 7,385,127 B2 * | 6/2008 | Sato et al. | .................... | 84/422.3 |
| 7,560,633 B1 * | 7/2009 | Wang | ............................. | 84/421 |
| 8,476,515 B2 * | 7/2013 | Coady | ................. | G10D 13/065 84/422.3 |
| 8,754,318 B2 * | 6/2014 | Mori | ...................... | G10H 3/146 84/415 |
| 2009/0229444 A1 * | 9/2009 | Measelle | ........................ | 84/421 |
| 2013/0174711 A1 * | 7/2013 | Lin | ........................ | G10D 13/06 84/422.3 |
| 2014/0196588 A1 * | 7/2014 | Takegawa | ..................... | 84/422.1 |
| 2015/0243267 A1 * | 8/2015 | Miyajima | ............ | G10D 13/026 84/421 |

FOREIGN PATENT DOCUMENTS

JP 63-122396 U 8/1988
JP 2006-154716 A 6/2006

* cited by examiner

*Primary Examiner* — Robert W Horn

(57) ABSTRACT

A boom tilter includes a tilter body, a boom, a holder, a bolt and nut. The tilter body is attached to a support post to be rotatable around a first axis, which is the axis of the support post. The holder is fitted to the tilter body to be rotatable around a second axis, which is orthogonal to the first axis. The boom is held by the holder to be rotatable around a third axis, which is the axis of the boom, and so that the boom can slide along the third axis.

7 Claims, 6 Drawing Sheets

MUSICAL INSTRUMENT TILTER AND CYMBAL STAND

BACKGROUND OF THE INVENTION

The present invention relates to a musical instrument tilter and a cymbal stand.

A tilter disclosed in Utility Model Application Publication No. 63-122396 includes: a fixed member, which is fixed to a stand; an intermediate member fitted to the fixed member by a first screw; and an outer member fitted to the intermediate member by a second screw. The intermediate and outer members have respective recessed parts for gripping a boom. In the tilter disclosed in this document, loosening the first screw allows the intermediate and outer members to rotate with respect to the fixed member, and thus the angle of the boom is adjustable with respect to the surface on which the stand is installed. Loosening the second screw releases the boom from being tightened by the intermediate and outer members, and thus the boom is allowed to rotate around or slide along its axis.

A tilter disclosed in U.S. Pat. No. 6,838,602 includes: a fixed member, which is fixed to a stand; a rotary member fitted to the fixed member by a screw; a screw member located in the rotary member and having a ring part. In the tilter disclosed in this document, loosening the screw allows the rotary member to rotate with respect to the fixed member, and thus the angle of the boom is adjusted. Additionally, the rotary member has an insertion hole into which the boom is inserted, the insertion hole being located in a place corresponding to the ring part of the screw member. Tightening a butterfly nut threaded onto the screw member presses the boom against the rotary member by the ring part, thereby fixing the boom in position. Conversely, loosening the butterfly nut releases the boom from the screw member and thus the boom is allowed to rotate around and/or slide along its axis.

In each of the tilters disclosed in Utility Model Application Publication No. 63-122396 and U.S. Pat. No. 6,838,602, the boom can be moved in three directions: around the axis of the screw, around the axis of the boom, along the axis of the boom. Therefore, even with a cymbal kept set together with a bass drum, snare drum, etc., a player can adjust the position and angle of the cymbal by moving the boom while seated.

However, in the foregoing conventional tilter, the boom cannot be moved in any direction other than the three directions described above. Accordingly, there may be a case where a player cannot adjust the cymbal of a drum set to the position and angle that he or she desires while seated. In this case, the player has to stand up and approach a cymbal stand arranged further away than the drum. Then, to adjust the position of the cymbal, he or she has to move the upper pipe section by operating the pipe joint of the cymbal stand or has to change the place where the cymbal stand is installed. However, the operation of the pipe joint usually takes place in a low location that is difficult for the player to reach, making the operation inconvenient and troublesome. Additionally, changing the place where the cymbal stand is installed requires moving the cymbal stand by hand, with the result that the tripod of the cymbal stand may come into contact with the support legs of the drum, and so on.

SUMMARY OF THE INVENTION

An object of the invention is to provide an instrument tilter and a cymbal stand that make it possible to finely adjust a musical instrument to a desired position and/or angle.

To solve the foregoing problem, according to a first aspect of the invention, there is provided a musical instrument tilter, including: a tilter body; and a holder fitted to the tilter body and holding a rod. The tilter body is attached to a structure extending along a first axis and is rotatable around the first axis. The holder is fitted to be rotatable around a second axis orthogonal to the first axis. The holder holds the rod such that the rod is rotatable around a third axis, which is an axis of the rod, and can slide along the third axis.

To solver the foregoing problem, according to a second aspect of the invention, there is provided a cymbal stand, including: a stand; a musical instrument tilter attached to the upper end of the stand; and a rod held by the musical instrument tilter and configured such that a cymbal may be attached thereto. The musical instrument tilter includes: a tilter body; and a holder fitted to the tilter body and holding the rod. The tilter body is attached to a structure extending along a first axis and is also rotatable around the first axis. The holder is fitted to be rotatable around a second axis orthogonal to the first axis. The holder holds the rod such that the rod is rotatable around a third axis, which is an axis of the rod, and can slide along the third axis.

DETAILED DESCRIPTION OF THE PREFERRED EMBODIMENTS

One embodiment in which a musical instrument tilter according to the invention is embodied in a boom tilter will be described below with reference to FIGS. 1 to 9.

Figure 1:
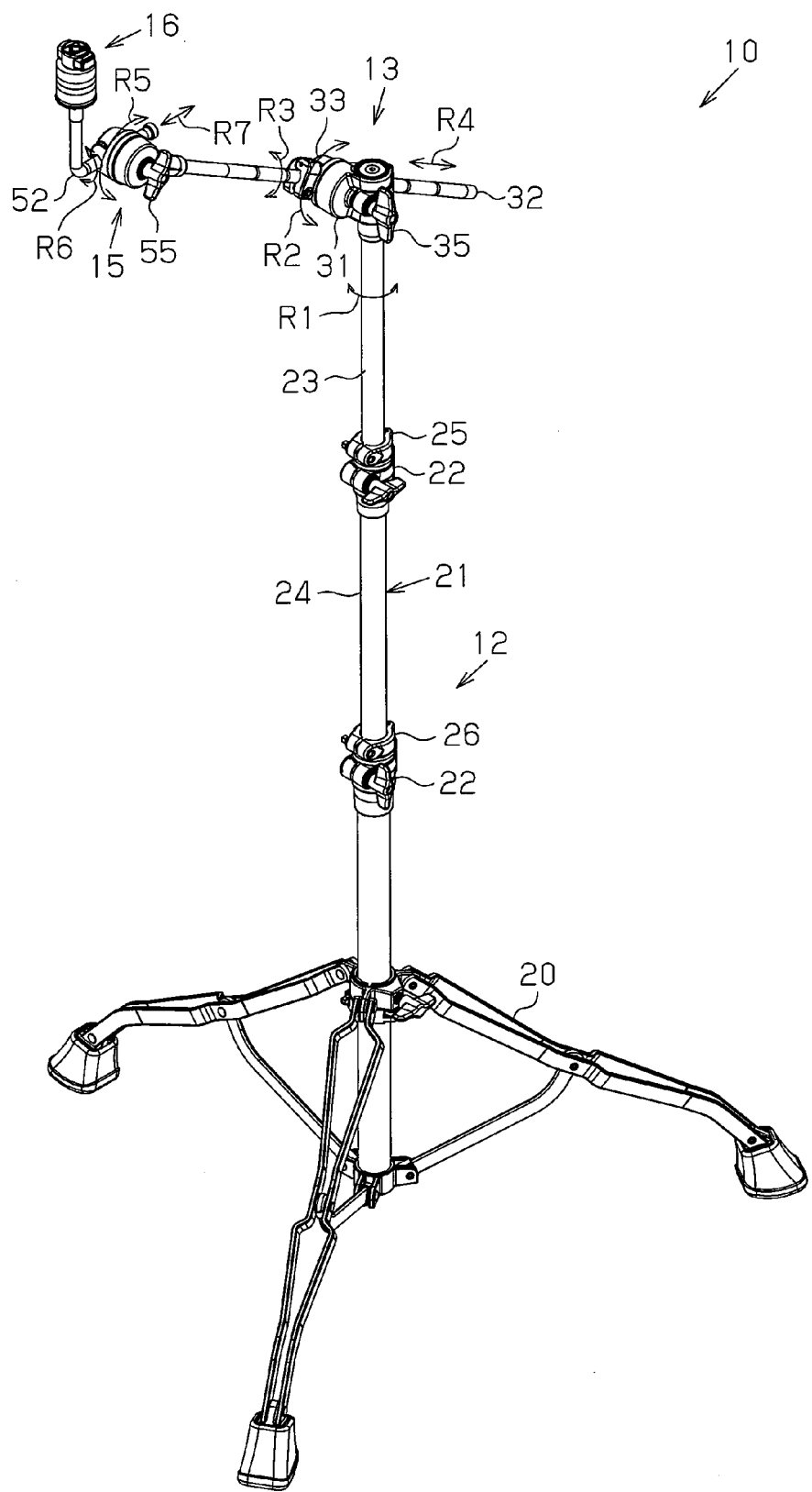
FIG. 1 is a perspective view of a cymbal stand to which a boom tilter according to the invention is attached.

As shown in FIG. 1, a cymbal stand 10 includes a stand 12, a boom tilter 13 attached to the upper end of the stand 12, a cymbal tilter 15 different from the boom tilter 13, and a cymbal holder 16 to which a cymbal is attached. The stand 12 includes a tripod 20 and a support post 21 extending upright from the center of the tripod 20. The support post 21 has three pipe sections of different diameters and two pipe joints 22 that fix two pipe sections of different diameters. In order to store the positions fixed relative to the other pipe sections, memory locks 25 and 26 are attached to the upper pipe section 23 located highest and the middle pipe section 24 located in the middle, respectively, among the three pipe sections.

Figure 2:
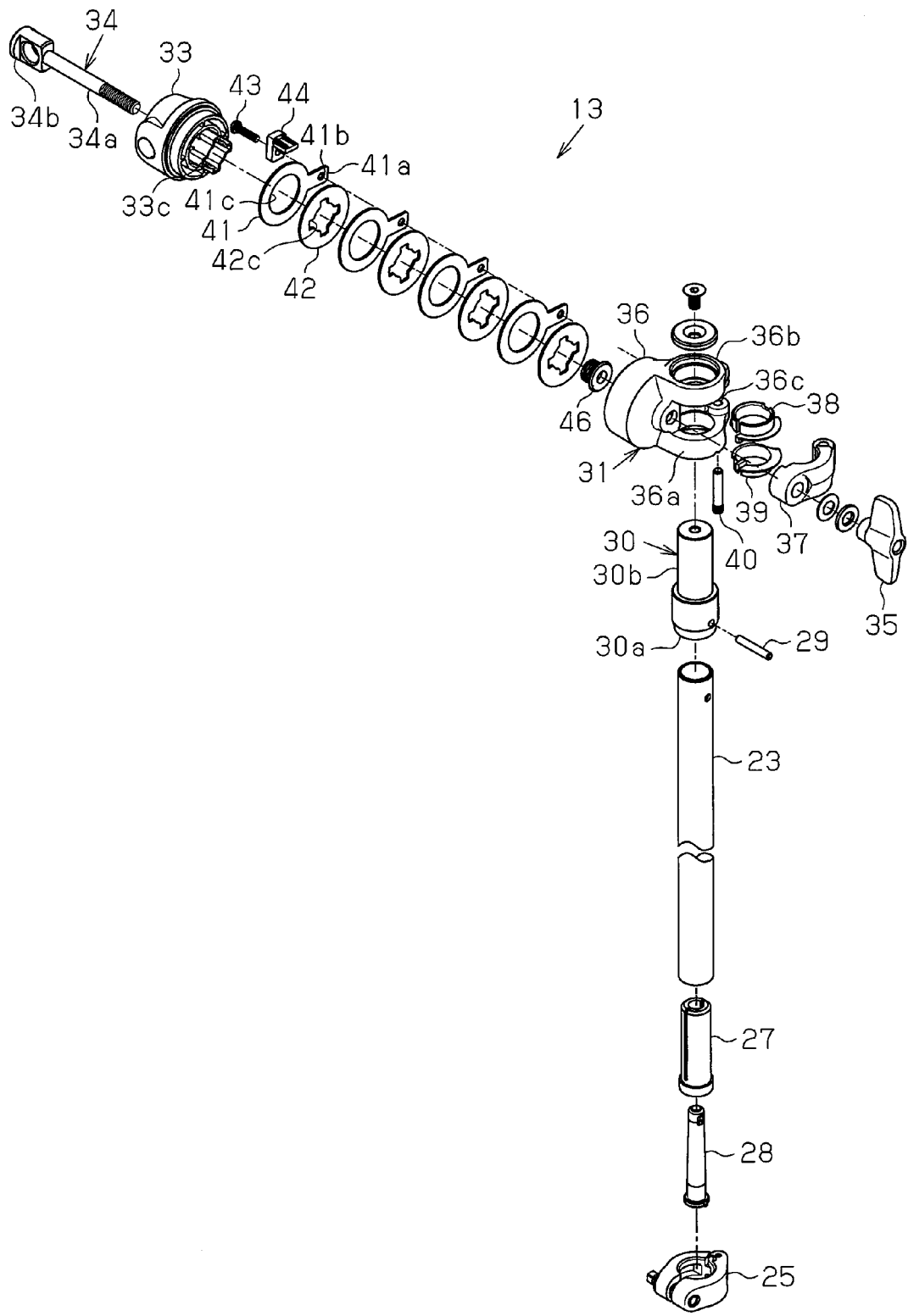
FIG. 2 is an exploded perspective view of the boom tilter.

As shown in FIG. 2, a cylindrical rubber member 27 is inserted in the lower end of the upper pipe section 23. Additionally, a stopper 28 with a tapered outer periphery is inserted to the inside of the rubber member 27. The rubber member 27 is fixed to the lower end of the upper pipe section 23 by the stopper 28. An approximately cylindrical support device 30 is fixed to the upper end of the upper pipe section 23 by a pin 29. The support device 30 includes a lower part 30a attached to the upper open end of the upper pipe section 23, and a cylindrical upper part 30b to which the boom tilter 13 is attached. The support post 21 and the support device 30 correspond to a structure extending along a first axis.

As shown in FIGS. 1 and 2, the boom tilter 13 includes: a tilter body 31; a long boom 32, which is a rod; a holder 33 holding the boom 32; and a bolt 34 and a nut 35, which are holding members. The bolt 34 includes: a shaft part 34a having a male screw thread on the leading end thereof; and a head part formed from a ring part 34b. By the bolt 34 and nut 35, the boom 32 is held by the holder 33, the holder 33 is fitted to the tilter body 31, and the tilter body 31 is attached to the support device 30.

As indicated by R1 in FIG. 1, the tilter body 31 is attached to the support post 21 and the support device 30 to be rotatable around a first axis. As indicated by R2 in FIG. 1, the holder 33 is fitted to the tilter body 31 to be rotatable around a second axis, which is orthogonal to the first axis. As indicated by R3 in FIG. 1, the boom 32 is held by the holder 33 to be rotatable around a third axis, which is the axis of the boom 32. As indicated by R4 in FIG. 1, the boom 32 is held by the holder 33 so that the boom 32 can slide along the third axis.

As shown in FIG. 2, the tilter body 31 includes first and second clamp members 36 and 37 made of metal, and upper and lower rings 38 and 39 made of resin. The first clamp member 36 includes a cylindrical basal part 36a in which the outer periphery of the lower ring 39 is fitted, a ring part 36b in which the outer periphery of the upper ring 38 is fitted, and a clamp part 36c to which the second clamp member 37 is connected.

Figure 3:
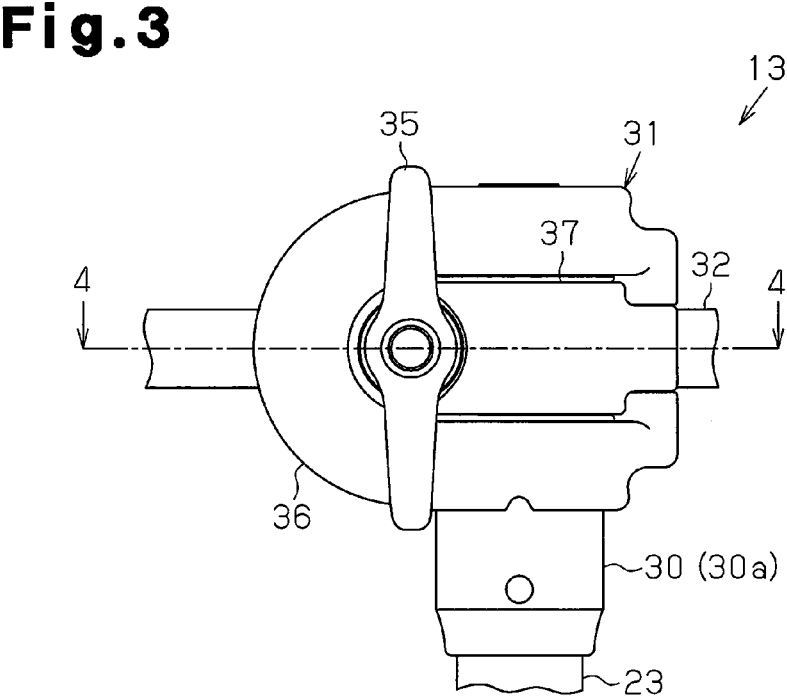
FIG. 3 is a partial side view of the boom tilter.
Figure 4:
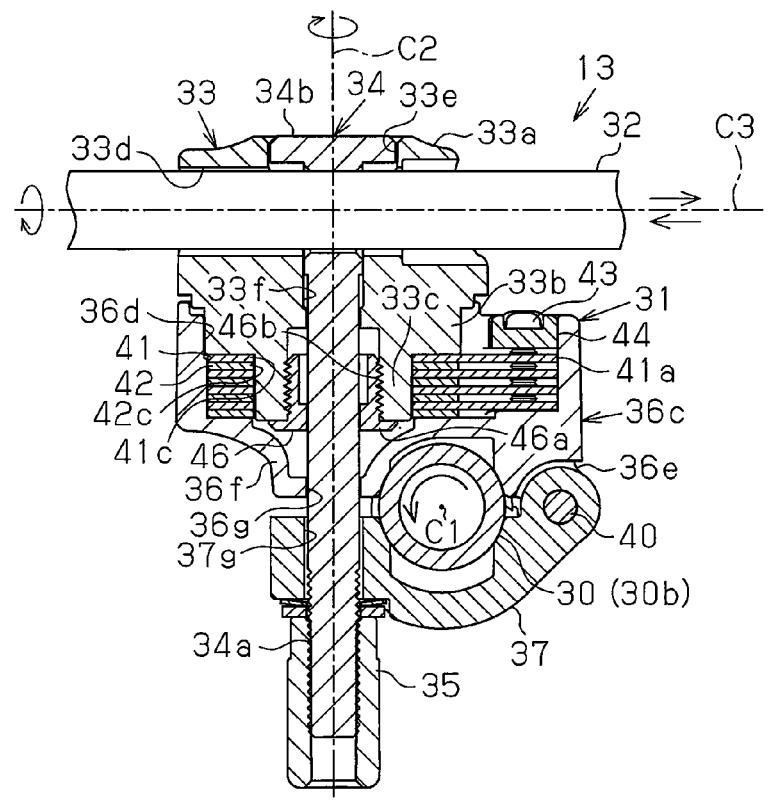
FIG. 4 is a cross-sectional view along the 4-4 line in FIG. 3.

As shown in FIGS. 3 and 4, formed on a side portion of the clamp part 36c is a connection part 36e to which the basal end of the second clamp member 37 is connected. The second clamp member 37 is connected to the connection part 36e to be rotatable via a connection pin 40. Formed in the center of the clamp part 36c is a projection 36f facing the leading end of the second clamp member 37.

Formed in the leading ends of the projection 36f and second clamp member 37 are insertion holes 36g and 37g, respectively, into which the bolt 34 is inserted. Tightly screwing a nut 35 onto the bolt 34 inserted in the insertion holes 36g and 37g fixes the leading end of the second clamp member 37 to the projection 36f. Consequently, since the first and second clamp members 36 and 37 grip the upper part 30b of the support device 30, the tilter body 31 is held to be immovable with respect to the support post 21 and support device 30. Thus, the tilter body 31 is fixed to the support post 21. On the other hand, loosening the nut 35 releases the upper part 30b from being gripped by the first and second clamp members 36 and 37, thus allowing the tilter body 31 to rotate around a first axis C1, which is the axis of the support post 21.

As shown in FIGS. 2 to 4, the first clamp member 36 has a recessed part 36d, which is on an opposite side of the clamp member 36 from the second clamp member 37. The recessed part 36d accommodates a part of the holder 33. The holder 33 includes a holding body 33a, a basal part 33b, and a cylindrical body 33c, which are arranged in the recessed part 36d of the first clamp member 36. The holding body 33a holds the boom 32. The cylindrical body 33c projects from the center of the holder 33 and is generally cross shaped. The holder 33 includes a holding hole 33d, in which the boom 32 is held, an arrangement hole 33e, in which the ring part 34b of the bolt 34 is arranged, and an insertion hole 33f, in which the shaft part 34a of the bolt 34 is inserted. The arrangement hole 33e, insertion hole 33f, and holding hole 33d communicate with one another near the center of the holder 33.

The holder 33 is fitted to the tilter body 31, with eight friction plates located between the basal part 33b and the first clamp member 36. The eight friction plates consist of four friction plates 41 with respective mounting tabs 41a and four friction plates 42 without mounting tabs 41a. An insertion hole 41b into which a screw 43 is inserted is formed in each mounting tab 41a. Each first friction plate 41 has a circular center hole 41c. Each second friction plate 42 has generally cross-shaped center hole 42c.

The first and second friction plates 41 and 42 are arranged alternately between the basal part 33b and first clamp member 36. Each first friction plate 41 and each second friction plate 42 are in close contact with each other while the cylindrical body 33c of the holder 33 is kept inserted in the center holes 41c and 42c thereof. The first friction plates 41 are fixed in the vicinity of the connection part 36e of the first clamp member 36 by an L-shaped support piece 44 and the screw 43. The second friction plates 42 are fitted on the cylindrical body 33c so that they do not rotate.

Figure 5:
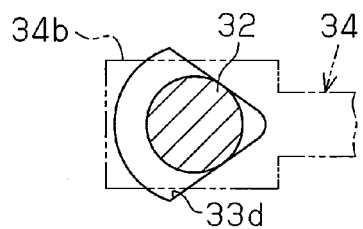
FIG. 5 is a schematic cross-sectional view showing the positional relation between the boom and a holding hole.

The bolt 34 passes through, in the following order, the arrangement hole 33e, the insertion hole 33f of the holder 33, the center holes 41c and 42c of the first and second friction plates 41 and 42, and the insertion holes 36g and 37g of the first and second clamp members 36 and 37. Then, the bolt 34 is threaded into the nut 35. Tightening the nut 35 in this state increases friction between the first and second friction plates 41 and 42, thus holding the holder 33 on the tilter body 31 such that the holder 33 does not rotate with respect to the tilter body 31. In such a manner, the holder 33 is fixed to the tilter body 31. As shown in FIG. 5, since the boom 32 is pressed against the inner periphery of the holding hole 33d by the ring part 34b of the bolt 34, the boom 32 is fixed to the holder 33. The holding hole 33d has the approximate cross-sectional shape of a sector of a circle. Accordingly, while kept fixed to the holder 33, the boom 32 is in linear-contact with the upper inner peripheral and lower inner peripheral surfaces of the holding hole 33d along the axis of the boom 32.

Conversely, loosening the nut 35 decreases friction between the first and second friction plates 41 and 42, thus allowing the holder 33 to rotate around a second axis C2 with respect to the tilter body 31. In this case, as indicated by the solid line in FIG. 4, the boom 32 is released from being pressed by the ring part 34b and is consequently allowed to rotate around a third axis C3 with respect to the holder 33. Additionally, the boom 32 is allowed also to slide along the third axis C3 with respect to the holder 33.

Additionally, in order to prevent the first and second friction plates 41 and 42 from being separated from the holder 33 when the nut 35 is loosened, a female screw thread is formed on the inner periphery of the cylindrical body 33c, and also a cylindrical plate stopper 46 is fixed to the female screw thread of the cylindrical body 33c. The plate stopper 46 includes a head part 46a, which is in contact with the end face of the cylindrical body 33c, and a screw thread part 46b, which is threaded into the female screw thread of the cylindrical body 33c. The shaft part 34a of the bolt 34 is inserted in the center of the plate stopper 46.

Figure 6:
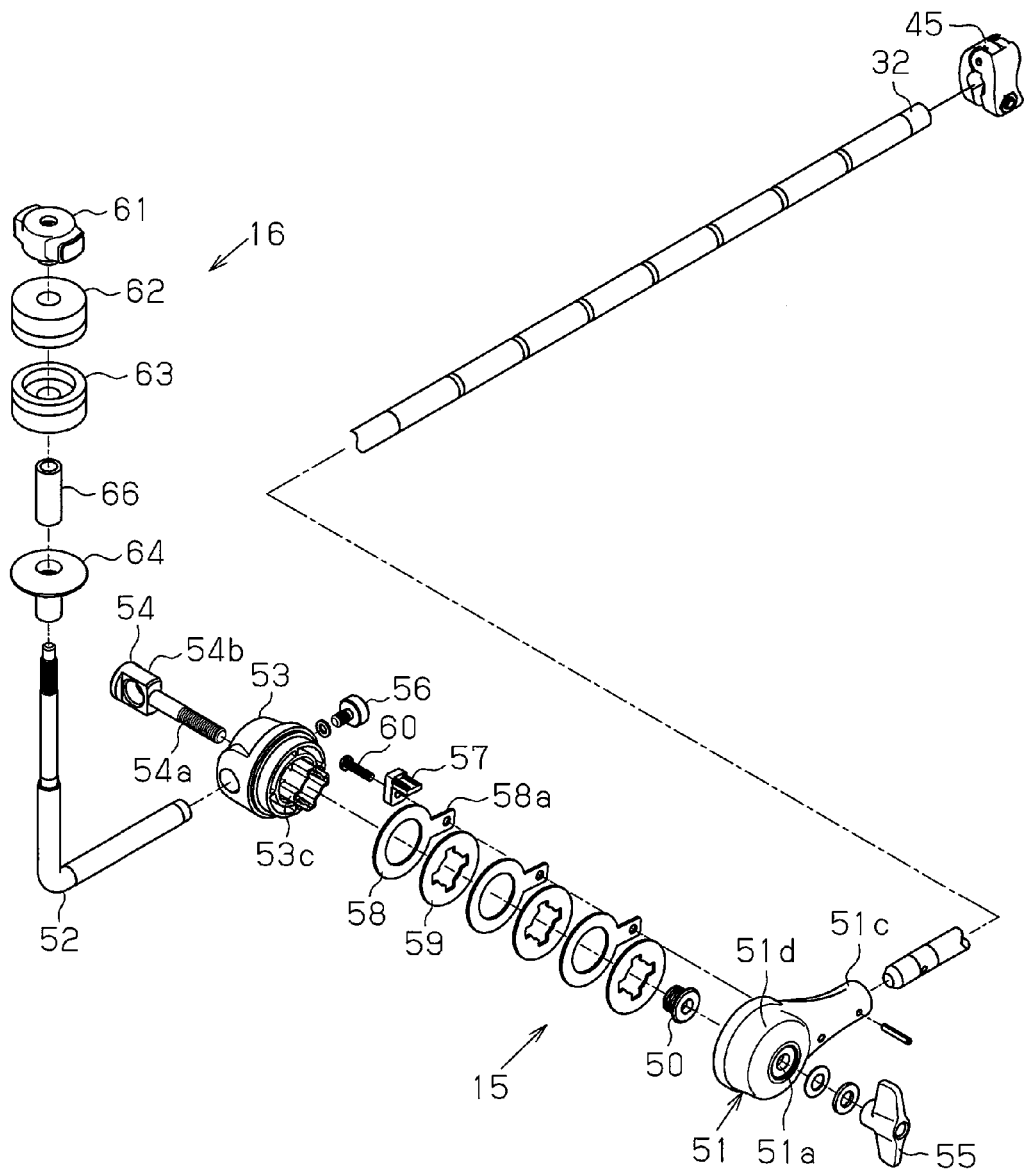
FIG. 6 is an exploded perspective view of a cymbal tilter.

As shown in FIGS. 1 and 6, a memory lock 45 is attached to the boom 32 in order to store its fixed position with respect to the holder 33. The cymbal holder 16 and the cymbal tilter 15 are attached to the leading end of the boom 32. The cymbal tilter 15 includes: a second tilter body 51 fitted on the leading end of the boom 32; an L-shaped rod 52, which is a second rod; a second holder 53 holding the L-shaped rod 52; and a bolt 54 and a nut 55, serving as holding members. The bolt 54 includes a shaft part 54a, which has a male screw thread on the leading end, and a head part, which is formed from a ring part 54b.

By the bolt 54 and nut 55, the L-shaped rod 52 is held by the second holder 53, and the second holder 53 is fitted to the second tilter body 51. As indicated by R5 in FIG. 1, the second holder 53 is fitted to the second tilter body 51 to be rotatable around a fourth axis, which is orthogonal to the axis of the boom 32. As indicated by R6 in FIG. 1, the L-shaped rod 52 is held by the second holder 53 to be rotatable around a fifth axis, which is the axis of the L-shaped rod 52. As indicated by R7 in FIG. 1, the L-shaped rod 52 is held by the second holder 53 so that the L-shaped rod 52 can slide along the fifth axis.

Figure 7:
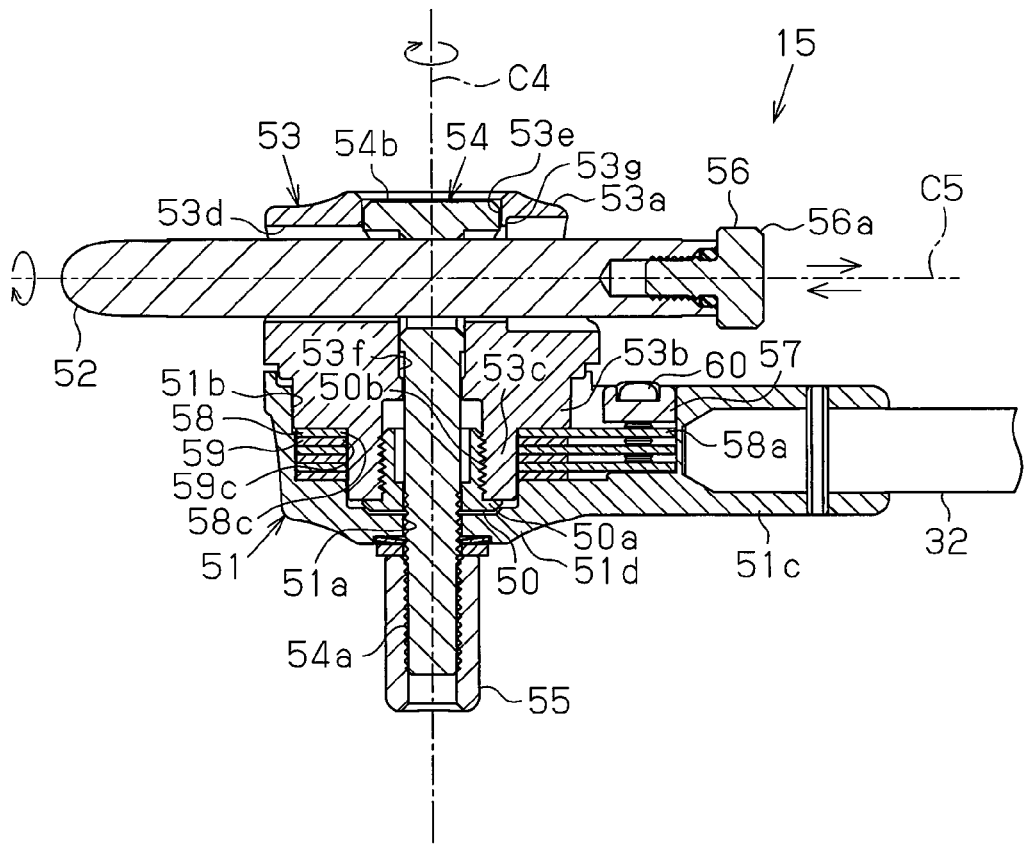
FIG. 7 is a cross-sectional view of a cymbal tilter.

As shown in FIGS. 6 and 7, the second tilter body 51 includes a fixed part 51c, which is fixed to the leading end of the boom 32, and a bottomed cylindrical part 51d to which the second holder 53 is fitted. An insertion hole 51a in which the shaft part 54a of the bolt 54 is inserted is formed in the center of the bottomed cylindrical part 51d. The second tilter body 51 has a recessed part 51b opposite the second holder 53 in order to accommodate a part of the second holder 53.

The second holder 53 includes: a holding body 53a holding the L-shaped rod 52; and a basal part 53b and a cylindrical body 53c, which are arranged in the recessed part 51b of the second tilter body 51. A cylindrical body 53c projects from the center of the holder 53 and has an approximately cross shape. The second holder 53 includes: a holding hole 53d holding the L-shaped rod 52; an arrangement hole 53e in which the ring part 54b of the bolt 54 is arranged; and an insertion hole 53f in which the shaft part 54a of the bolt 54 is inserted. The arrangement hole 53e, insertion hole 53f, and holding hole 53d communicate with one another near the center of the second holder 53. Formed on the boundary between the arrangement hole 53e and holding hole 53d is a step 53g.

The basal end of the L-shaped rod 52 projects from the holding hole 53d of the second holder 53. A bolt 56 with a head part 56a greater in diameter than the L-shaped rod 52 is threaded into the basal end of the L-shaped rod 52. The head part 56a is brought into contact with the step 53g, thereby preventing separation of the L-shaped rod 52 from the second holder 53.

The second holder 53 is fitted to the second tilter body 51, with six friction plates interposed between the basal part 53b and the second tilter body 51. The six friction plates consist of three friction plates 58 with respective mounting tabs 58a and three friction plates 59 without mounting tabs 58a. Each first friction plate 58 has a circular center hole 58c. Each second friction plate 59 has a center hole 59c, which is generally cross-shaped.

The first and second friction plates 58 and 59 are arranged alternately between the basal part 53b and second tilter body 51. Each first friction plate 58 and each second friction plate 59 are in close contact with each other while the cylindrical body 53c of the second holder 53 is kept inserted in the center holes 58c and 59c thereof. The first friction plates 58 are fixed to the second tilter body 51 by an L-shaped support piece 57 and a screw 60. The second friction plates 59 are fitted on the cylindrical body 53c so that they do not rotate.

Figure 8:
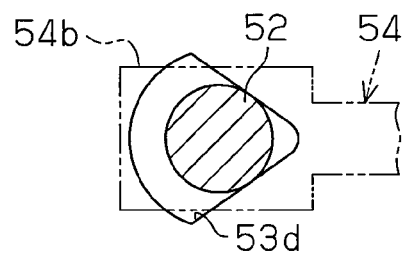
FIG. 8 is a schematic cross-sectional view showing the positional relation between an L-shaped rod and a holding hole.

The bolt 54 passes through, in the following order, the arrangement hole 53e and insertion hole 53f of the second holder 53, the center holes 58c and 59c of the first and second friction plates 58 and 59, and the insertion hole 51a of the second tilter body 51, and then is threaded into the nut 55. Tightly screwing the nut 55 in this state increases friction between the first and second friction plates 58 and 59, thus holding the second holder 53 on the second tilter body 51 such that the holder 53 does not rotate with respect to the tilter body 51. In such a manner, the second holder 53 is fixed to the second tilter body 51. As shown in FIG. 8, since the L-shaped rod 52 is pressed against the inner periphery of the holding hole 53d by the ring part 54b of the bolt 54, the L-shaped rod 52 is fixed to the second holder 53. The holding hole 53d has the approximate cross sectional shape of a sector of a circle. Accordingly, while kept fixed to the second holder 53, the L-shaped rod 52 is in linear-contact with the upper inner peripheral and lower inner peripheral surfaces of the holding hole 53d along the axis of the L-shaped rod 52, which extends in the lateral direction of the L-shaped rod 52.

Conversely, loosening the nut 35 decreases friction between the first and second friction plates 58 and 59, thus allowing the second holder 53 to rotate around a fourth axis C4 with respect to the second tilter body 51. In this case, as indicated by the solid line in FIG. 7, the L-shaped rod 52 is released from being pressed by the ring part 54b and is consequently allowed to rotate around a fifth axis C5 with respect to the second holder 53. Additionally, the L-shaped rod 52 is allowed also to slide along the fifth axis C5 with respect to the second holder 53.

In order to prevent separation of the first and second friction plates 58 and 59 from the second holder 53 when the nut 55 is loosened, a female screw thread is formed on the inner periphery of the cylindrical body 53c, and also a cylindrical plate stopper 50 is fixed to the female screw thread of the cylindrical body 53c. The plate stopper 50 includes a head part 50a located in contact with the end face of the cylindrical body 53c, and a screw thread part 50b threaded into the female screw thread of the cylindrical body 53c. The shaft part 54a of the bolt 54 is inserted in the center of the plate stopper 50.

Figure 9:
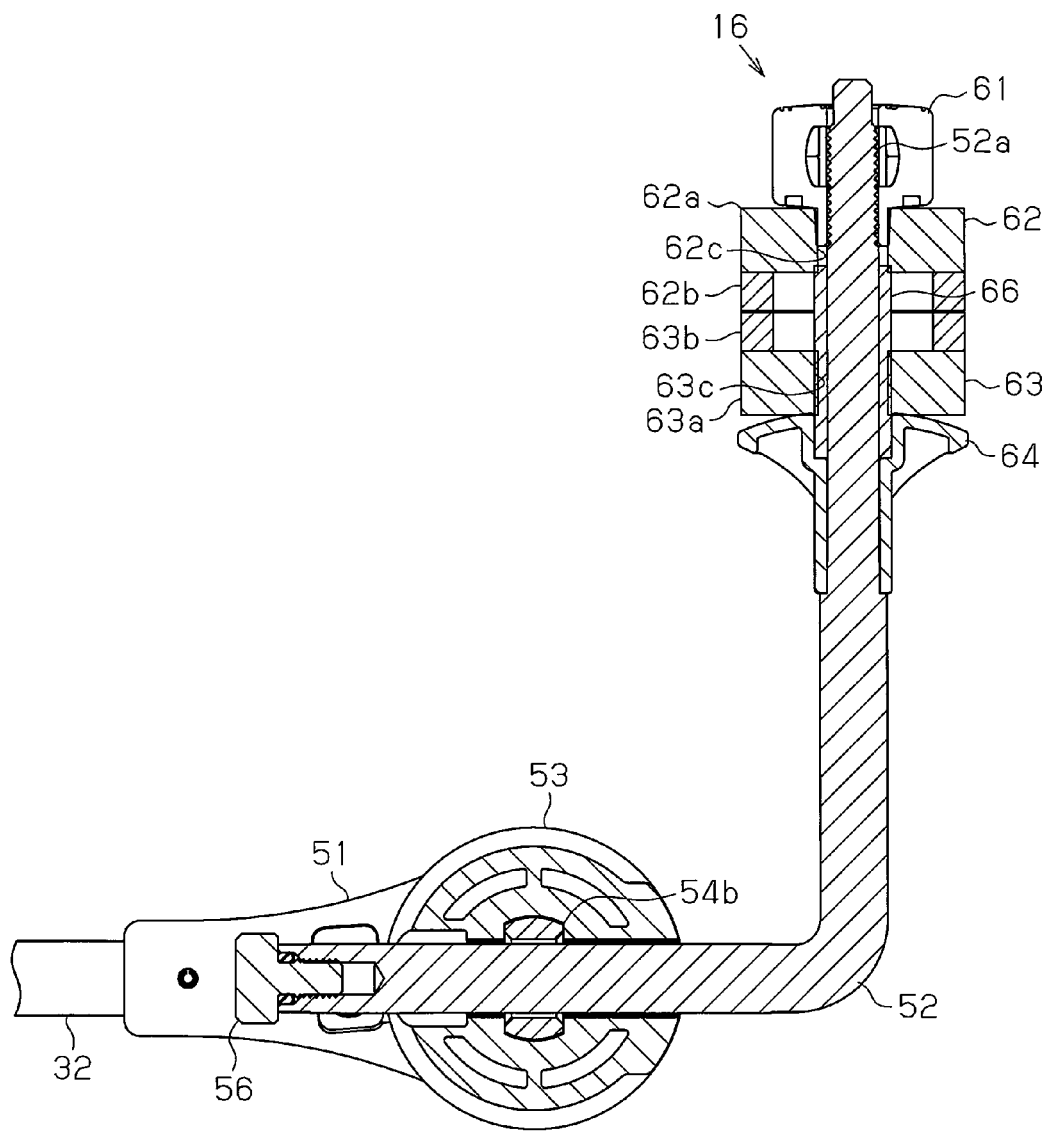
FIG. 9 is a partial cross-sectional view around the cymbal tilter and around a cymbal holder.

As shown in FIGS. 6 and 9, the components of the cymbal holder 16 such as a fastener 61, a pair of upper and lower cushioning members 62 and 63 which are made of felt, and a retainer 64 are attached to the leading end of the L-shaped rod 52. The retainer 64 is located lowest among the components of the cymbal holder 16, and fixed to the L-shaped rod 52. A cylindrical guide member 66 is located above the retainer 64 on the L-shaped rod 52. The guide member 66 is made of an elastic material such as urethane rubber. The upper and lower cushioning members 62 and 63 are attached to the guide member 66.

The cushioning members 62 and 63 respectively include: disk parts 62a and 63a with their respective center holes 62c and 63c; and annular parts 62b and 63b fixed to the disk parts 62a and 63a. The annular parts 62b and 63b are the parts that are in contact with a cymbal. Therefore, taking abrasion resistance into account, these annular parts are made of a comparatively hard felt material. In order to decrease the area of contact with the cymbal, the annular parts 62b and 63b have inner diameters larger than those of the center holes 62c and 63c of the disk parts 62a and 63a. The disk parts 62a and 63a are made of a comparatively soft felt material taking account of absorption of vibration caused by the cymbal.

The cushioning members 62 and 63 are arranged such that the cymbal is sandwiched by the annular parts 62b and 63b. The fastener 61 is located above the cushioning member 62 on the L-shaped rod 52. The fastener 61 is threaded onto a male screw thread 52a formed on the leading end of the L-shaped rod 52. Part of the fastener 61 is inserted in the center hole 62c of the cushioning member 62.

Next, operation of the boom tilter 13 described above will be described.

As shown in FIGS. 1 and 4, loosening the nut 35 of the boom tilter 13 releases the support device 30 from being gripped by the first and second clamp members 36 and 37. Consequently, the tilter body 31 is allowed to rotate around the first axis C1, which is the axis of the support post 21. At the same time, as indicated by the solid line in FIG. 4, the boom 32 is released from being pressed by the ring part 34b, thus allowing the boom 32 to rotate around the third axis C3 with respect to the holder 33 and also to slide along the third axis C3 with respect to the holder 33. As described above, the tilter body 31 is configured to be rotatable around the first axis C1 of the support post 21, thus increasing by one the directions in which the boom 32 is movable compared to the conventional tilter. Consequently, as well as being rotated around each of the first to third axes, the boom 32 can be slid along the third axis.

As shown in FIGS. 1 and 7, the cymbal stand 10 has further the cymbal tilter 15, which is different from the boom tilter 13. Loosening the nut 55 of the cymbal tilter 15 allows the second holder 53 to rotate around the fourth axis C4 with respect to the second tilter body 51. At the same time, as indicated by the solid line in FIG. 7, the L-shaped rod 52 is released from being pressed by the ring part 54b, thus allowing the L-shaped rod 52 to rotate around the fifth axis C5 with respect to the second holder 53 and also to slide along the fifth axis C5 with respect to the second holder 53.

According to the present embodiment, the boom 32 can be rotated around any of the first to third axes and can also be slid along the third axis, and the L-shaped rod 52 can be rotated around either the fourth or fifth axis and can also be slid along the fifth axis. Thus, while the boom 32 is moved in any of the four different directions, the L-shaped rod 52 can also be moved in any of the three different directions. Accordingly, with the cymbal attached to the cymbal stand 10, the movable range of the cymbal can be broadened compared to a conventional one. Therefore, it is possible for a player even while seated to adjust the cymbal of a drum set to a desired position and angle by moving the boom 32 and the L-shaped rod 52.

Therefore, the present embodiment can obtain advantageous effects as described below.

(1) The tilter body 31 is attached to the support post 21 to be rotatable around the first axis C1, which is the axis of the support post 21. The holder 33 is fitted to the tilter body 31 to be rotatable around the second axis C2 orthogonal to the first axis. The boom 32 is held by the holder 33 to be rotatable around the third axis C3, which is the axis of the boom 32, and so that the boom 32 can slide along the third axis C3. According to the present embodiment, the tilter body 31 is configured to be rotatable around the first axis C1 of the support post 21. Therefore, the directions in which the boom 32 is movable are increased by one compared to a conventional tilter. As a result, the boom 32 can be rotated around any of the first axis C1 to third axis C3 and can also slide along the third axis C3. Accordingly, it is possible to adjust the position and angle of the cymbal while moving the boom 32 in any of the four different directions. Since the movable range of the boom 32 is broader, the cymbal can be adjusted to more desired positions and angles.

(2) By the bolt 34 and nut 35, the boom 32 is held by the holder 33, the holder 33 is fitted to the tilter body 31, and also the tilter body 31 is attached to the support device 30. In this configuration, the bolt 34 and nut 35 have the function of holding the boom 32 on the holder 33, the function of fitting the holder 33 to the tilter body 31, and the function of attaching the tilter body 31 to the support post 21. In other words, the bolt 34 and nut 35 are able to have a configuration that simultaneously releases the tilter body 31 from the support post 21, releases the holder 33 from the tilter body 31, and releases the boom 32 from the holder 33.

(3) Tightening the nut 35 grips the upper part 30b of the support device 30 by the first and second clamp members 36 and 37. Accordingly, the tilter body 31 is securely fixed to the support post 21. Loosening the nut 35 releases the support device 30 from being gripped by the first and second clamp members 36 and 37. Accordingly, the tilter body 31 can be rotated around the first axis C1 of the support post 21.

(4) Tightening the nut 35 increases friction between the first and second friction plates 41 and 42. Accordingly, the holder 33 can securely be fixed to the tilter body 31. Loosening the nut 35 decreases friction between the first and second friction plates 41 and 42. Accordingly, the holder 33 can be rotated around the second axis C2 with respect to the tilter body 31.

Also, the boom tilter 13 is able to adjust pivotally in a stepless manner, unlike a gear type tilter that is able to adjust in steps. Additionally, increasing the respective numbers of the first and second friction plates 41 and 42 can increase force with which the holder 33 is fixed to the tilter body 31. The cymbal tilter 15 can also exhibit the same advantageous effect as the boom tilter 13 in terms of operation.

(5) Fastening the nut 35 presses the boom 32 against the inner periphery of the holding hole 33d by the ring part 34b of the bolt 34. Accordingly, the boom 32 can securely be fixed to the holder 33. Loosening the nut 35 releases the boom 32 from being pressed by the ring part 34b. Accordingly, the boom 32 can be rotated around the third axis C3 with respect to the holder 33 or slid along the third axis C3. By virtue of the foregoing effects described in (3) and (4), simply loosening the nut 35 simultaneously allows rotation of the tilter body 31 around the first axis C1, rotation of the holder 33 around the second axis C2, rotation of the boom 32 around the third axis C3 and/or sliding of the boom 32 along the third axis C3. Accordingly, simply by adjusting the one part, the boom 32 can be moved in four different directions, thus improving operability for adjustment of the position and angle of the cymbal.

(6) The cymbal stand 10 includes the boom tilter 13 attached to the upper end of the stand 12, and the cymbal tilter 15 attached to the leading end of the boom 32. In this configuration, using both the boom tilter 13 and cymbal tilter 15 allows finer adjustment of the position and angle of the cymbal.

(7) The second holder 53 is fitted to the second tilter body 51 to be rotatable around the fourth axis orthogonal to the axis of the boom 32. Additionally, the L-shaped rod 52 is held by the second holder 53 to be rotatable around the fifth axis, which is the axis of the L-shaped rod 52, and can slide along the fifth axis. In this configuration, the boom 32 can be rotated around any of the first to third axes and also slid along the third axis, and/or the L-shaped rod 52 can be rotated around either the fourth or fifth axis and also slid along the fifth axis. That is, the position and angle of the cymbal can be finely adjusted by moving the boom 32 in any of the four different directions and also by moving the L-shaped rod 52 in any of the three different directions simultaneously.

(8) In the boom tilter 13, the female screw thread is formed on the inner periphery of the cylindrical body 33c and also the cylindrical plate stopper 46 is fixed to this female screw thread of the cylindrical body 33c. In this configuration, since the screw thread part 46b of the plate stopper 46 has been threaded into the female screw thread of the cylindrical body 33c, the first and second friction plates 41 and 42 are prevented from being separated from the holder 33 when the nut 35 is loosened. Also in the cymbal tilter 15, the female screw thread is formed on the inner periphery of the cylindrical body 53c and also the cylindrical plate stopper 50 is fixed to the female screw thread of the cylindrical body 53c. Accordingly, since the screw thread part 50b of the plate stopper 50 has been threaded into the female screw thread of the cylindrical body 53c, the first and second friction plates 58 and 59 are prevented from being separated from the second holder 53 when the nut 55 is loosened.

The present embodiment may be modified as described below.

In the present embodiment, the approximately cylindrical support device 30 is fixed to the upper end of the upper pipe section 23, and the boom tilter 13 is attached to the upper part 30b of the support device 30. Instead of this, the boom tilter 13 may be directly attached to the upper end of the upper pipe section 23.

In the present embodiment, the tilter body 31 is fixed to the support post 21 by tightening the nut 35 onto the bolt 34. Instead, the insertion hole 37g of the second clamp member 37 may be replaced with a screw hole, and the tilter body 31 may be fixed to the support post 21 by tightening the bolt 34 into the screw hole of the second clamp member 37. Similarly, also in the cymbal tilter 15, the insertion hole 53f of the second tilter body 51 may be replaced with a screw hole and the second holder 53 may be fixed to the second tilter body 51 by tightening the bolt 54 into the screw hole.

In the present embodiment, the boom tilter 13 and the cymbal tilter 15 may be replaced with gear type tilters.

In the present embodiment, instead of the boom 32, the L-shaped rod 52 may be fixed to the holder 33 in order to use the boom tilter 13 as a cymbal tilter.

In the present embodiment, the holding parts holding the boom 32 and L-shaped rod 52 are holding holes 33d and 53d respectively. However, the holding parts may be U-shaped recessed parts that match the respective outer peripheries of the boom 32 and L-shaped rod 52.

In the present embodiment, the musical instrument tilter is used as a cymbal stand tilter. However, it may be used as a drum stand tilter.

The invention claimed is:

1. A musical instrument titter, comprising:
   a tilter body;
   a holder fitted to the tilter body and holding a rod; and
   a holding member configured to hold the rod on the holder,
   wherein the tilter body is attached to a structure extending along a first axis and is rotatable around the first axis,
   the holder is fitted to be rotatable around a second axis, which is orthogonal to the first axis,
   the holder holds the rod such that the rod is rotatable around a third axis, which is an axis of the rod, and can slide along the third axis, and
   the holding member fits the holder to the tilter body and fits the tilter body to the structure.

2. The musical instrument tilter according to claim 1, wherein
   the holding member includes a bolt and a nut, and the nut is threaded to the bolt,
   the tilter body includes a first clamp member and a second clamp member, and the second clamp member is connected to the first clamp member,
   each of the first and second clamp members have an insertion hole through which a shaft part of the bolt is inserted, and
   tightening the nut grips the structure by the first and second clamp members, thus fixing the tilter body to the structure, and loosening the nut releases the structure from being gripped by the first and second clamp members, thus allowing the filter body to rotate around the first axis.

3. The musical instrument tilter according to claim 2, wherein the tilter body and the holder are fitted, with a plurality of friction plates located therebetween, and wherein tightening the nut increases friction between the friction plates, thus fixing the holder to the tilter body, and loosening the nut decreases friction between the friction plates, thus allowing the holder to rotate around the second axis.

4. The musical instrument tilter according to claim 2, wherein the bolt includes a ring part through which the rod is inserted, wherein the holder includes a holding part configured to hold the rod in a position corresponding to the ring part, and wherein tightening the nut presses the rod against the holding part by the ring part, thus fixing the rod to the holder, and loosening the nut releases the rod from being pressed by the ring part, thus allowing the rod to rotate around the third axis and to slide along the third axis.

5. The musical instrument tilter according to claim 1, wherein a second musical instrument tilter, which is different from the musical instrument tilter, is attached to a leading end of the rod.

6. The musical instrument tilter according to claim 5, wherein the second musical instrument tilter includes a second tilter body, which is attached to the leading end of the rod, and a second holder, which is fitted to the second tilter body and holds a second rod, wherein the second holder is fitted to be rotatable around a fourth axis, which is orthogonal to an axis of the rod, and wherein the second holder holds the second rod such that the second rod is rotatable around a fifth axis, which is an axis of the second rod, and can slide along the fifth axis.

7. A cymbal stand, comprising:
   a stand;
   a musical instrument tilter attached to the upper end of the stand; and
   a rod held by the musical instrument tilter and configured such that a cymbal can be attached thereto, wherein the musical instrument tilter includes:
   a tilter body;
   a holder that is fitted to the tilter body and holds the rod, and
   a holding member configured to hold the rod on the holder,
   wherein the tilter body is attached to a structure extending along a first axis and is rotatable around the first axis,
   the holder is fitted to be rotatable around a second axis, which is orthogonal to the first axis,
   the holder holds the rod such that the rod is rotatable around a third axis, which is an axis of the rod, and is can slide along the third axis, and
   the holding member fits the holder to the tilter body and fits the tilter body to the structure.

* * * * *